United States Patent [19]

Jubert et al.

[11] Patent Number: 4,869,431

[45] Date of Patent: Sep. 26, 1989

[54] NOZZLE AND A DEVICE FOR THE USE OF A NOZZLE OF THIS TYPE

[75] Inventors: Xavier Jubert, Boulogne Billancourt; Jean-François Bonnin, Vauhallan, both of France

[73] Assignee: Bronzavia-Air Equipement, Asnieres, France

[21] Appl. No.: 163,755

[22] PCT Filed: Jun. 12, 1987

[86] PCT No.: PCT/FR87/00215

§ 371 Date: Apr. 8, 1988

§ 102(e) Date: Apr. 8, 1988

[87] PCT Pub. No.: WO87/07853

PCT Pub. Date: Dec. 30, 1987

[30] Foreign Application Priority Data

Jun. 17, 1986 [FR] France ................................ 86 08718

[51] Int. Cl.⁴ ........................ B05B 1/32; F02M 19/02; F02M 61/04; G05D 7/01

[52] U.S. Cl. ................................ 239/533.13; 239/570; 137/845; 138/45; 138/46

[58] Field of Search ................ 239/533.13, 533.4, 570, 239/602; 138/44, 45, 46; 137/845 X

[56] References Cited

U.S. PATENT DOCUMENTS

| | | | |
|---|---|---|---|
| 2,593,315 | 4/1952 | Kraft | 138/45 |
| 2,676,470 | 4/1954 | Streitz | 138/44 |
| 2,899,981 | 8/1959 | Binks | 138/46 |
| 3,144,968 | 8/1964 | Martino et al. | 239/533.13 |
| 3,151,626 | 10/1964 | Everett | 137/845 |
| 3,566,902 | 3/1971 | Muller | 138/45 |
| 3,628,140 | 12/1971 | Hogg et al. | 138/44 |
| 3,750,710 | 8/1973 | Hayner | 138/44 |
| 3,877,514 | 4/1975 | Beck | 138/45 |
| 4,003,398 | 1/1977 | Duveau | 137/845 |
| 4,242,112 | 12/1980 | Jebens | 137/845 |

FOREIGN PATENT DOCUMENTS 2418674 9/1979 France .

*Primary Examiner*—Andres Kashnikow
*Assistant Examiner*—Karen B. Merritt
*Attorney, Agent, or Firm*—Oblon, Spivak, McClelland, Maier & Neustadt

[57] ABSTRACT

A nozzle and a device for the application of the nozzle are disclosed. In the nozzle a mechanism is provided so that the dimensions of the hole for the flow of fluid can be varied according to the pressure differential between the inlet and the outlet. The above can be applied to the making of nozzles and/or devices, the delivery rate of which is directly proportionate to the differential pressure between the inlet and the outlet.

18 Claims, 3 Drawing Sheets

SECTION AA

FIG_1 PRIOR ART
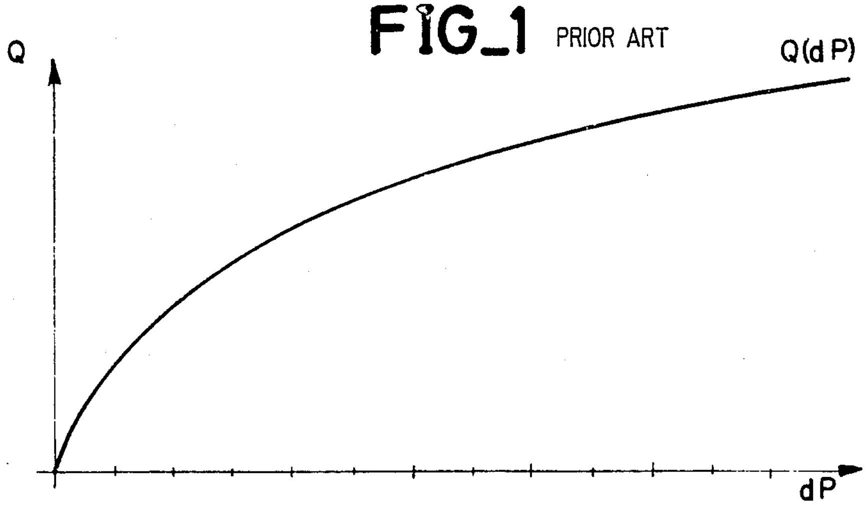
FIG_2-a
PRIOR ART
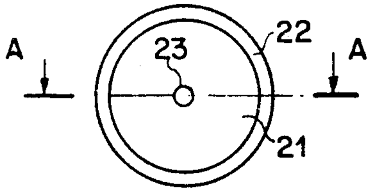
FIG_2-b
PRIOR ART
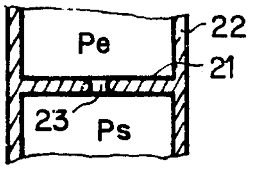
SECTION AA
FIG_3-a
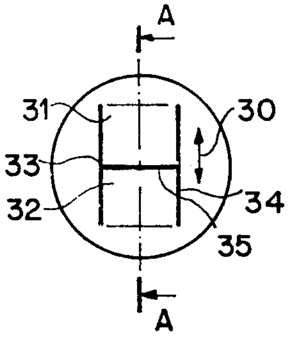
FIG_3-b
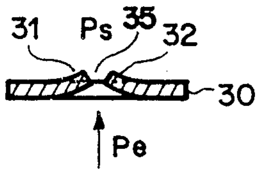
SECTION AA
FIG_4
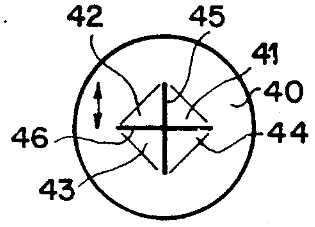

FIG_5-a
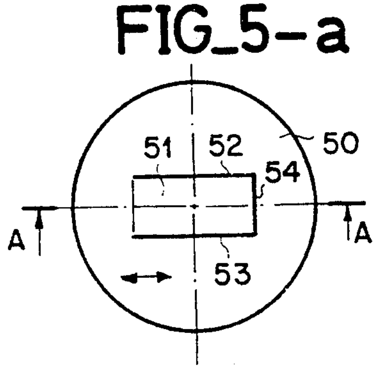
FIG_5-b
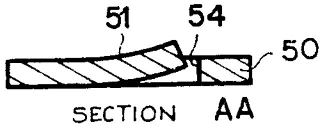
FIG_6-a
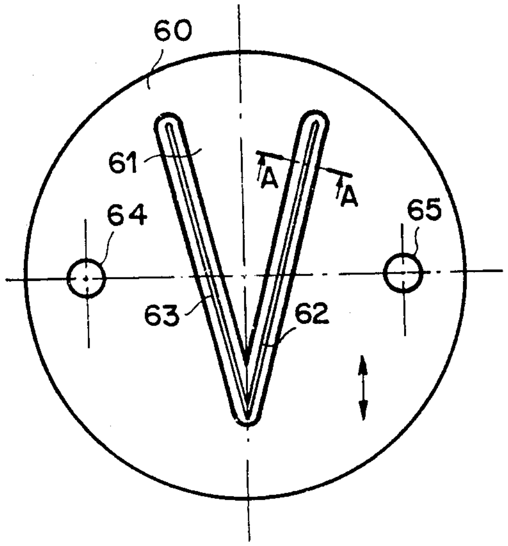
FIG_6-b
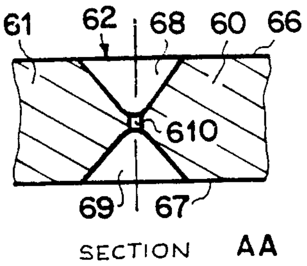
FIG_7
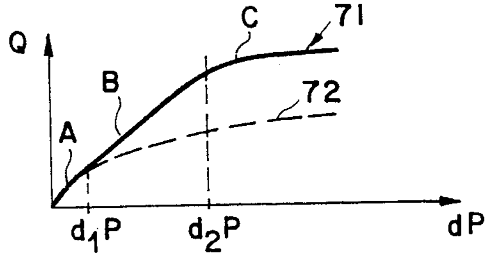

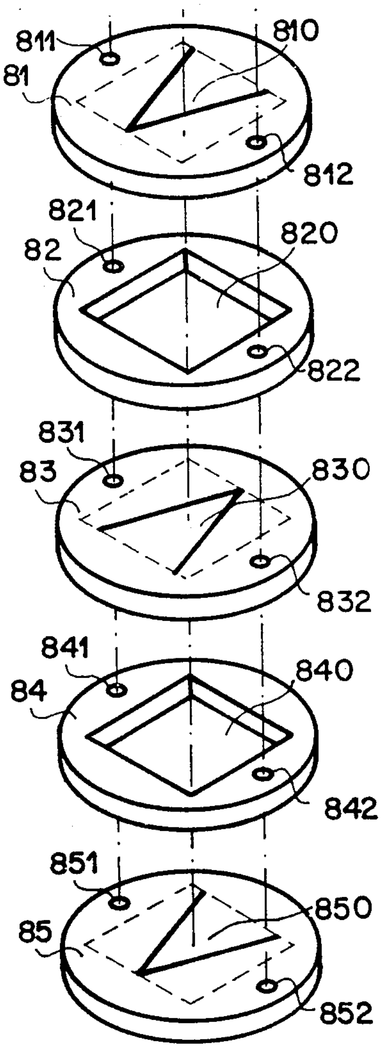
FIG_8
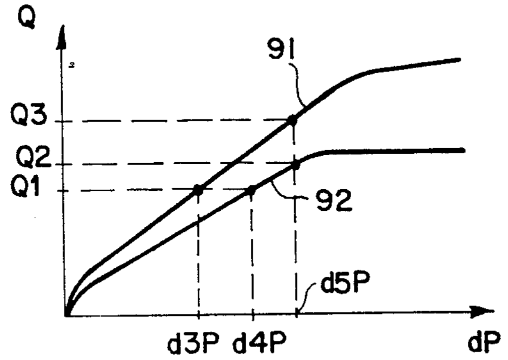
FIG_9

NOZZLE AND A DEVICE FOR THE USE OF A NOZZLE OF THIS TYPE

BACKGROUND OF THE INVENTION

1. Field of the Invention

The invention pertains to a nozzle, namely a part that is designed to be placed in a hydraulic or pneumatic system and having a hole calibrated to limit or regulate the delivery of the fluid flowing in the system. It also pertains to a device for the application of a nozzle of this type.

2. Description of the Prior Art

There are nozzles in the fuel-injection devices of engines or in jacks or valves or else, again, in certain devices for dampening the vibrations to which any elements or systems may be subjected, or which may be produced by these elements or systems.

However, the nozzles used in these various applications have the disadvantage of having a delivery rate which is proportionate to the square root of the pressure differential existing between the inlet and the outlet of the calibrated hole. More precisely, the delivery rate is proportionate to the product of the square root of the pressure differential by the area of the hole. This particular feature may be troublesome in certain cases, especially when it is sought to obtain a specific delivery rate at the outlet of the nozzle by using it in a loop for the regulation of the delivery rate. For, in this precise instance, if it is sought to double the delivery rate with respect to a given value, the pressure differential corresponding to the value must be multiplied by 4. This means, for example, that if the outlet hole of the nozzle is in a zone having a constant pressure, the inlet pressure must be made to vary in order to cause a variation in the delivery rate. It also means that if the outlet pressure is small compared to the inlet pressure, it is necessary to multiply the inlet pressure practically by a factor of 4 to double the outlet delivery rate.

In a case of this type, the pressure needed at the inlet of the injector varies almost exponentially, and when the values become high, great variations are necessary in the inlet pressure to obtain appreciable variations in the delivery rate. Now the inlet pressure is given by means placed upstream of the hydraulic or pneumatic circuit, and the result of this is that the energy needed to actuate these means also varies almost exponentially. Since the efficiency of the said means is not perfect and is not constant along its entire range of use, the relative difference between the energy given to these means and the energy that they produce is all the greater as the delivery rate and/or input power values diverge from the rated value which can be given by the said means.

The nozzle of the invention does not have these disadvantages.

According to the invention, a nozzle comprises means so that the dimensions of the hole for the flow of fluid vary according to the pressure differential existing between its inlet and its outlet.

According to another characteristic of the invention, the nozzle has a flat part through which at least two cuts are made, defining at least one tongue designed to be placed in the path of the fluid and capable of being deflected elastically when there is a pressure differential between its two sides.

According to another characteristic of the invention, when there is no pressure differential on either side of the tongue, its main plane and the plane of the flat part on which it is made are identical and, when there is a pressure differential, the tongue is deflected towards the zone where there is low pressure.

Consequently, when the tongue or tongues are in the idle position, the hole for the flow of fluid is at its minimum size. The area of the said hole then corresponds to the total area of the cuts made in the flat part. When the pressure differential increases, the tongue or tongues are deflected and the cross-section of the fluid passage also increases. The delivery rate is therefore greater than the delivery rate that would have been had if the cross-section had not undergone variation.

In one embodiment of the nozzle, the cuts are made in such a way that at least one part of the delivery rate curve as a function of the differential pressure is linear, the delivery rate in this part being directly proportionate to the differential pressure between the inlet and the outlet.

SUMMARY OF THE INVENTION

The main object of the invention is a nozzle comprising a flat part through which at least two cuts are made, defining at least one tongue which is designed to be placed in the path of the fluid and is capable of being elastically deflected, thus increasing the cross-section of the fluid passage when there is a pressure differential between its two sides, nozzle wherein each cut comprises two grooves that are parallel to each other, one on each of the sides of the flat part, and also comprises a slit of the same length as the grooves.

BRIEF DESCRIPTION OF THE DRAWINGS

Other characteristics and advantages of the invention will emerge from the following description of some embodiments, made with reference to the appended figures, of which:

FIG. 1 shows the curve of the delivery rate as a function of the pressure differential of a prior art nozzle;

FIGS. 2*a* and 2*b* give two views of a prior art nozzle;

FIGS. 3*a*, 3*b*, 4, 5*a* and 5*b* show views of various embodiments of nozzles according to the invention;

FIGS. 6*a* and 6*b* show two views of a preferred embodiment of a nozzle according to the invention;

FIG. 7 is the delivery rate/pressure differential curve of the nozzle of FIG. 6.

FIGS. 8 and 9 pertain to an embodiment of a device comprising at least one nozzle according to the invention.

DESCRIPTION OF PREFERRED EMBODIMENTS

FIG. 1 shows the curve Q(dp) of the delivery rate Q of a prior art nozzle as a function of the pressure differential dp between its inlet and its outlet.

In a nozzle of this type, the expression of the delivery rate Q has the form Q=k.S.dp where k is a coefficient which is related, in particular, to the nature of the fluid flowing in the system and S is the cross-section of the nozzle hole. It can be seen that the slope of the curve diminishes with distance from its starting point, i.e. when the pressure differential increases. This means that, if it is desired to use a nozzle of this type as a delivery rate regulator, it becomes increasingly difficult to regulate the delivery rate when the pressure differentials are high between the inlet and the outlet.

FIGS. 2*a* and 2*b* show two views of a prior art nozzle for which the delivery rate curve Q as a function of the pressure differential dp between the inlet and the outlet is that of FIG. 1. FIG. 2*b* is a section view along AA of FIG. 2*a*.

The nozzle comprises, for example, a flat part 21 placed in the circuit of the fluid flowing in the hydraulic or pneumatic system. This part of the circuit is, for example, a pipe 22.

The effective part of the nozzle is a hole 23, made through the flat part 21 placed in the pipe. The delivery rate depends on the cross-section of this hole and is, therefore, proportionate to the square root of the pressure differential (Pe-Ps) between the inlet and the outlet of the nozzle.

FIGS. 3*a* and 3*b* show an embodiment of the nozzle according to the invention, which makes it possible to resolve the problems raised by prior art nozzles. FIG. 3*b* is a cross-section view along AA of FIG. 3*a* when a flow of fluid is established.

The nozzle consists essentially of a flat part 30, provided with two tongues 31, 32 which are deformable by elasticity when a pressure is exerted on one of their sides. These two tongues are obtained by making three cuts 33, 34, 35 in the flat part. Two of the cuts 33, 34 are parallel to each other, and the third cut 35 is perpendicular to them and joins their midpoints. Thus, in a top view (FIG. 3*a*), the cuts have the shape of an H and the two tongues 31, 32 are opposite each other.

When the difference between the input pressure Pe and the output pressure Ps of the nozzle becomes sufficient to overcome the elastic strength of the tongues, these tongues are deflected and the hole, which initially had the section of the cut, increases its section. Thus, for a given pressure differential, the delivery rate is greater to that which would have existed if the cross-section of the hole were to remain constant.

FIG. 4 shows an alternative embodiment in which there is also provision for making four triangular-shaped tongues, 41, 42, 43 and 44 on a flat part 40. These tongues are obtained, for example, by making two cuts 45, 46 which intersect at their middle point.

Preferably, as FIG. 4 shows, the cuts 45, 46 are of equal length and are perpendicular to each other. Thus, in this case, the four tongues have the same shape and area. However, the number of tongues can be increased by increasing the number of cuts and by making them intersect, preferably at equal angles.

As in the previous case, when the pressure differential becomes greater than the lower threshold of deflection of the tongues, the cross-section of the fluid passage increases.

FIGS. 5*a* and 5*b* show two views of another alternative embodiment, FIG. 5*b* being a cross-section view along AA of FIG. 5*a* when there is a pressure differential.

The rectangular-shaped tongue 51 has been made also in a flat part 50 by making three cuts 52, 53, 54 in this said flat part. Two of these are parallel with each other, and the third cut joins one end of each of the first two cuts.

As can be seen in FIG. 5*b*, the tongue 51 is also deflected when the pressure differential becomes sufficient to overcome its lower threshold of deflection, and the cross-section of the hole for the flow of fluid then increases as and when the pressure differential increases beyond this threshold.

The various embodiments that have just been described make it possible to obtain, for a pressure differential greater than the lower threshold of deflection of the tongues, a delivery rate which is greater than that which would have been obtained if the hole for the flow of fluid were to keep a constant cross-section. Consequently, the energy needed to increase the delivery rate by a given value in these types of nozzles is smaller than that needed in prior art nozzles, and nozzles according the invention are therefore easier to use than those of the prior art.

FIGS. 6*a* and 6*b* show two distinct views of the preferred embodiment of a nozzle according to the invention, FIG. 6*b* being a cross-section view along AA of FIG. 6*a* which can also be applied to the cuts described in the previous figures.

This nozzle also comprises a flat part 60 in which a single triangular tongue 61 is made. For this, two cuts 62, 63 forming an acute angle with each other and having a common end are made in the flat part 60.

In order to fix the nozzle to its surrounding elements, at least two holes 64, 65, are provided near the edges of the flat part 60 to enable the passage of screws or parts having the same function. Other fixing means can be considered.

Similar holes or equivalent means have not been shown in FIGS. 3*a*, 4, 5*a* which show the other embodiments. However, it is clear that they are also necessarily present in these figures.

The cuts 62, 63 are straight as can be seen in FIG. 6*a* and, in the thickness of the flat part, they preferably have the shape shown in FIG. 6*b*.

Each cut connects the two mutually parallel main sides 66, 67 of the flat part 60 and comprises two grooves 68, 69, one on each side, connected by a slit 610.

Preferably, the longitudinal axes of the grooves 68, 69 are parallel to each other. Preferably, the said axes are borne on one and the same plane perpendicular to the two sides 66, 67 and the longitudinal axis of the slit 610 which joins the two grooves is parallel to them.

In a preferred embodiment, the grooves 68, 69, have a milled shape as can be seen in FIG. 6*b*. For this, each groove 68, 69, has three distinct walls, two of them forming its sides, which are symmetrical with a plane perpendicular to the axes, and the third wall forming its bottom.

Between the walls forming the sides of the groove, there is a determined acute angle which is preferably greater than or equal to 45°. The wall forming the bottom is rounded and the slit 610 joining two grooves 68, 69, ends in the middle of this wall forming the bottom. Thus, this wall forming the bottom consists of two rounded half-walls separated by the joining slit 610. The slit has the same length as the grooves.

It is clear that the special slits and grooves that have just been described for the nozzle with a triangular tongue can be made on the types of nozzles described earlier within the framework of this invention.

The embodiment with a triangular tongue made between two cuts, each consisting of two grooves with a milled shape, joined by a slit, has additional advantages as compared with the other embodiments described later. For they make it possible to obtain a delivery rate curve as a function of the differential pressure which is linear in at least one part of its working range.

This curve is shown in a solid line in FIG. 7, under the reference 71. Another curve 72 is shown in a broken line. This is the characteristic curve of prior art nozzles.

The curve 71 of the preferred embodiment of the nozzle of the invention has been shown in three parts A, B, C, each having a different curve.

The part A, at the start of the curve, between the starting point and a pressure differential d1p, corresponds to the interval during which the tongue 61 undergoes no deflection, for the pressure differential values do not reach the lower threshold of deflection of the tongue. For this part A, the curve has the shape of a curve for a prior art nozzle since the cross-section of the hole remains constant.

Thus, if a prior art nozzle which gives the curve 72 has a hole for which the constant cross-section is equal to the cross-section of the hole of the nozzle according to the invention before the tongue has started being deflected, it is observed that the part A of the curve 71 of the nozzle of the invention is the same as the start of the curve 72. The part B of the curve 71, between the pressure differential values d1p and d2p, is the linear part. In this part of the curve, a variation of the delivery rate Q is directly proportionate to a variation of the pressure differential. This characteristic is especially valuable because a nozzle of this type can be used in a delivery rate regulating loop in a very simple way, by making it work in this linear part for, in this case, the associated servo-control or control elements are easier to use.

The part C of the curve 71 is the one that can be observed from the moment when the tongue 61 has reached its maximum deflection. In this case, the hole for the flow of fluid becomes constant and the delivery rate becomes proportionate to the square root of the pressure differential. In the example shown, the tongue reaches its maximum deflection for the pressure differential d2p.

It is clearly understood that curve of the delivery rate Q as a function of pressure differential dp, existing between the inlet and the outlet of the nozzle, depends essentially, on the one hand, on the material used to make it, and, on the other hand, on the initial cross-section of the hole i.e. the cross-section of the cuts.

For the deflection starts all the more quickly as the initial cross-section is small and as the elasticity of the tongue is great. By acting on these parameters, the part A of the curve 71 can be reduced or, on the contrary, accentuated, depending on the use envisaged for the nozzle.

Preferably, a nozzle having a triangular tongue 61 consists of a flat circular part 60 made of steel.

In this embodiment, the flat part 60 has a diameter of 16 mm. and its thickness is about 1 mm. The two cuts form an angle of about 30° between each other and are about 10 mm. long. Between the walls forming the sides of each groove 68, 69 there is an angle of about 90°, and the radius of curvature of the wall forming the bottom is about 0.15 mm. The slit 610, that joins the bottoms of the two grooves forming a cut, is 0.1 mm wide and 10 mm long while the total depth of a groove between a side 66, 67 of the flat part and the intersection of a groove with a slit 610 is about 0.45 mm.

Preferably, the nozzles are made of steel and the grooves and slits are machined by electroerosion in every type of nozzle according to the invention. Furthermore, a trueing treatment for the sides is done after the grooves and the slits have been made.

FIGS. **3*a*, 4, 5*a* and 6*a*** have a double arrow indicating, as the case may be, the main direction of the fibers of the constituent material of the nozzles. It is thus seen that the axis of deflection of the tongues, shown in certain figures by a thin line, joining the free ends of two slits, always forms an angle equal to at least 45° with the main direction of the fibers, firstly so that the elasticity of the tongues is sufficient and, secondly, to prevent the risk of breaks along the fibers.

FIGS. 8 and 9 pertain to an embodiment of a device comprising at least two nozzles according to the invention. The association of at least two similar nozzles can be used to obtain a different resultant curve, hence a curve with different characteristics.

FIG. 8 shows an exploded view of a device comprising three nozzles made according to the preferred embodiment of the invention.

These three nozzles each have a flat part, 81, 83, 85 and a tongue 810, 830 and 850. To enable the deflection of the tongues, interposed parts are provided to separate two neighboring tongues. Each interposed part consists of flat part 82, 84 with a window 820, 840 drilled through it. This window lets a tongue go through it when this tongue is deflected. When there are no such interposed parts, two neighboring nozzles will be attached by their sides and it will not be possible for the deflection of the tongues to take place.

Furthermore, at least two holes 811, 812, 821, 822; . . . 851, 852 are provided in each nozzle and each interposed part, to enable the fixing of these various elements with one another and with the associated hydraulic or pneumatic system, using appropriate means not shown in the figure.

These means may be screws, studs or any other equivalent parts fulfilling the same function.

Preferably, as can be seen in FIG. 8, when the device has at least two identical nozzles, they are placed parallel to each other, but the tongues are not pointed in the same direction. In the embodiment of FIG. 8, two neighboring tongues are offset by 180° with respect to one another. This arrangement provides for the optimum distribution of stresses on the structure during operation.

The windows made in the interposed elements have at least one straight side designed to be positioned so that its perpendicular projection in the plane of the associated nozzle passes through the free ends of the slits. Consequently, when a nozzle is fixed between two interposed elements, the straight side of the window of each these two interposed elements faces the axis of deflection and the movement of the tongue is perfectly controlled. In order to enable an angular offset between two neighboring tongues, separated by an interposed element, the window of the interposed element should have at least two straight sides, and to enable an 180° offset, these two sides should be opposite and parallel to each other.

In FIG. 8, the windows are square shaped and the projections of their sides on the nozzles are shown in broken lines. The nozzles are offset by 180°, but the square shape enables an offset of 90° between two nozzles.

In one embodiment, not shown, the windows are rectangular and this suffices to make offsets of 180° by using the small side of the rectangle as the support of the axis of deflection.

The use of at least two identical nozzles makes it possible to increase the pressure differential while, at the same time, obtaining one and the same delivery rate, or else, to reduce the delivery rate while having the same pressure differential as with only one nozzle.

FIG. 9 shows a first curve 91 of the delivery rate Q as a function of the pressure differential dp of a nozzle according to the preferred embodiment. This first curve 91 faces a second curve 92 of the delivery rate Q of a device formed by the association of at least two nozzles according to the preferred embodiment, each having identical characteristics or similar characteristics to those given by the first curve 91.

It is observed, from these curves, that a single nozzle gives a delivery rate Q1 for a pressure differential of d3p, whereas a device consisting of at least two identical nozzles gives the same delivery rate Q1 for a pressure differential of d4p greater than the pressure differential d3p.

Furthermore, it is observed that one and the same pressure differential d5p corresponds to a delivery rate Q2 of the device which is lower than a delivery rate Q3 of a single nozzle.

The association of at least two identical nozzles therefore makes it possible to obtain a device having pre-set characteristics with great flexibility.

It is generally possible to associate different nozzles, the curve of each one of them being known, to obtain a determined value. The invention is therefore especially advantageous since it provides for making devices having a transfer function that can be easily calculated.

What is claimed is:

1. A nozzle for regulating fluid flow in a fluid passage comprising, a flat part through which at least two cuts are made, each cut comprises a first groove on a first side of the flat part, a slit, and a second groove on a second side of the flat part, the cuts defining at least one tongue which is designed to be placed in the path of the fluid flow and is capable of being deflected, wherein the cross-section of the fluid passage is increased when there is a pressure differential between both sides of said tongue, said nozzle having a working range in which a delivery rate curve of the fluid is a linear function of the differential pressure in at least one part of said nozzle working range.

2. A nozzle according to claim 1, wherein each of said first and second grooves have two flat walls forming two sides, and a third rounded wall forming a bottom.

3. A nozzle according to claim 2, wherein the slit ends in the middle of the wall forming the bottom of each of said first and second grooves.

4. A nozzle according to claim 2, wherein, between the flat walls forming the sides of each of said first and second grooves, there is an angle of at least 45°.

5. A nozzle according to claim 4, wherein, between the flat walls forming the sides of each of said first and second grooves, there is an angle of about 90°.

6. A nozzle according to claim 4, wherein the depth of each of said first and second grooves up to an intersection with the slit is about 0.45 mm.

7. A nozzle according to claim 6, wherein the width of the slit is about 0.1 mm.

8. A nozzle according to claim 1, wherein said nozzle is made of a fibrous material.

9. A nozzle according to claim 8, wherein, between an axis of deflection of said at least one tongue and the direction of fibers of the material, there is an angle which is at least equal to 45°.

10. A nozzle according to claim 1, wherein said nozzle is made of steel.

11. A nozzle according to claim 1, comprising means to fix said nozzle to surrounding elements.

12. A nozzle according to claim 11, wherein said fixing means comprises at least two holes enabling screws and/or studs to pass through.

13. A device according to claim 1, comprising at least two nozzles placed adjacent to each other.

14. A device according to claim 1, comprising at least two identical nozzles.

15. A device according to claim 13, comprising, between said two adjacent nozzles, an interposed part consisting of a flat part with window drilled in it, said window permitting the deflection of said at least one tongue, and comprising means for fixing it to the two nozzles that it separates.

16. A device according to claim 15, wherein the window comprises at least one straight side, designed to be placed so that it faces the axis of deflection of said at least one tongue.

17. A device according to claim 16, wherein the window has at least two straight sides parallel to each other.

18. A device according to claim 17, wherein the window has the shape of a quadrilateral such as a square or a rectangle.

* * * * *